US006489591B1

(12) United States Patent
Achtner

(10) Patent No.: US 6,489,591 B1
(45) Date of Patent: Dec. 3, 2002

(54) COOLING AIR CIRCUITS FOR WELDING MACHINE

(75) Inventor: Richard Mark Achtner, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/545,965

(22) Filed: Apr. 10, 2000

(51) Int. Cl.$^7$ ................................................. B23K 9/10
(52) U.S. Cl. ................................................... 219/130.1
(58) Field of Search ................................. 219/133, 132, 219/130.1; 290/1 B

(56) References Cited

U.S. PATENT DOCUMENTS

| | | | | |
|---|---|---|---|---|
| 3,253,118 A | * | 5/1966 | Frederick ................. 219/130.5 |
| 3,567,902 A | * | 3/1971 | Stearns et al. ............... 219/131 |
| 3,829,740 A | * | 8/1974 | Beasley ....................... 317/100 |
| 4,694,140 A | * | 9/1987 | Wheeler et al. .......... 219/130.1 |
| 4,835,405 A | * | 5/1989 | Clancey et al. ............ 290/1 A |
| 5,406,050 A | * | 4/1995 | Macomber et al. ...... 219/130.1 |
| 5,624,589 A | * | 4/1997 | Latvis et al. ................. 219/133 |
| 5,642,260 A | | 6/1997 | Sigl |
| 5,751,568 A | * | 5/1998 | Danjo et al. ................... 363/95 |
| 5,757,638 A | * | 5/1998 | Katooka et al. ............. 363/146 |
| 5,825,642 A | * | 10/1998 | Ishii et al. .................... 363/141 |
| 5,831,240 A | | 11/1998 | Katooka et al. |
| 5,837,968 A | * | 11/1998 | Rohrberg et al. ......... 219/130.1 |
| 5,838,554 A | * | 11/1998 | Lanni ........................... 363/21 |
| 5,890,460 A | * | 4/1999 | Ball et al. ................... 123/41.7 |
| 5,943,220 A | * | 8/1999 | Shikata et al. ............... 361/818 |
| 5,968,385 A | * | 10/1999 | Beeson et al. ......... 219/130.33 |
| 5,977,644 A | * | 11/1999 | Smith .......................... 290/1 B |
| 6,081,423 A | * | 6/2000 | Griffin ......................... 361/688 |

FOREIGN PATENT DOCUMENTS

JP 3-268483 11/1991

OTHER PUBLICATIONS

Maxstar 91 Owners Manual, pp. 24–27, Miller Electric Co.

* cited by examiner

Primary Examiner—Tom Dunn
Assistant Examiner—Zidia Pittman
(74) Attorney, Agent, or Firm—John H. Pilarski; Mark W. Croll

(57) ABSTRACT

A welding machine power supply has two circuits for cooling air. A primary circuit comprises a magnetics chamber and a second chamber. A fan between the magnetics and second chambers draws atmospheric air through one end panel into the magnetics chamber and blows it through the second chamber. The second chamber is comprised of a pair of heat sinks. Major heat generating components are mounted to the heat sinks outside the second chamber. The fan is sandwiched between the magnetics chamber and the heat sinks such that all the air blown by the fan flows through the heat sinks and out a second end panel. A wind tunnel is also part of the second chamber. A counterflow circuit extends from the second end panel to the magnetics chamber. The negative pressure in the magnetics chamber draws atmospheric air through the second end panel to the magnetics chamber, thereby cooling minor heat generating components outside of the primary circuit and not associated with the heat sinks.

21 Claims, 7 Drawing Sheets

COOLING AIR CIRCUITS FOR WELDING MACHINE

BACKGROUND OF THE INVENTION

1. Field of the Invention

This invention pertains to electric arc welding power sources or machines, and more particularly to cooling tungsten inert gas (TIG) welding machine power supplies.

2. Description of the Prior Art

It is well known that the power supplies of electric arc welding machines, including tungsten inert gas (TIG) welding machines, generate considerable amounts of heat. To assure continuous and proper operation, the heat must be removed from the power supplies. For that purpose, various types of air cooling designs have been developed. For example, U.S. Pat. No. 5,831,240 shows a welding machine power supply having end panels with louvers in them. A fan next to one of the louvers blows air through the power supply from one end panel to the other. Some of the cooling air passes through a heat sink to which several major heat generating components are mounted. A deficiency of the design of the Pat. No. 5,831,240 is that much of the cooling air does not flow through the heat sink. Thus, maximum efficiency is not attained for cooling the major heat generating components. In addition, dirty air is blown over delicate electronic components.

U.S. Pat. No. 5,642,260 describes a welding machine having an air tunnel between the two ends of the power supply housing. A fan at one end of the tunnel blows air through the tunnel. Some heat generating components are inside the tunnel. Others are located outside the tunnel but are mounted to two heat sinks that are inside the tunnel. The air flowing through the tunnel directly cools the heat generating components that are inside the tunnel. The cooling air also directly cools the heat sinks inside the tunnel and thus indirectly cools the heat generating components that are outside the tunnel but that are mounted to the heat sinks. Components of the power supply that are neither in the tunnel nor mounted to the heat sinks are in a dead space, i.e., they are not directly cooled at all.

The Lincoln Electric Company of Cleveland, Ohio, markets an arc converter that includes a fan between two ends of a housing. The fan draws air into the housing from both sides of the housing and pushes the air through a tunnel and out one end of the housing. Both a heat sink and heat generating components are present in the tunnel. The cooling air directly cools the components inside the tunnel and indirectly cools the components mounted to the heat sink outside the tunnel.

Despite the various cooling systems incorporated into prior welding machine power supplies, there nevertheless is room for improvements to them.

SUMMARY OF THE INVENTION

In accordance with the present invention, cooling circuits for electronic equipment is provided that efficiently cools both major and minor heat generating components. This is accomplished by a counterflow circuit that cools the minor heat generating components in addition to a primary circuit that cools major heat generating components.

The primary circuit extends between upstream and downstream ends of a housing. A first chamber at the housing upstream end contains some minor heat generating components. Other minor heat generating components are located within the housing but outside of the primary circuit.

There is a second chamber at the housing downstream end. A fan divides the first and second chambers. The second chamber has a periphery that is aligned with the fan such that all the cooling air blown by the fan flows through the second chamber along the primary circuit. According to one aspect of the invention, the second chamber periphery next to the fan is composed of center and side walls of two symmetrically arranged heat sinks. All the air blown by the fan flows through the two heat sinks. In a preferred embodiment, the first heat sink reaches between the fan and the primary circuit downstream end. First major heat generating components are mounted to the first heat sink outside of the second chamber. Second major heat generating components are mounted to the second heat sink outside of the second chamber. There is a wind tunnel between the second heat sink and the primary circuit downstream end that contains third major heat generating components.

Operation of the fan draws cooling air through the housing upstream end into the first chamber of the primary curcuit. The fan blows the air through the second chamber and out the housing downstream end. The cooling air thus has a negative pressure in the first chamber and a positive pressure in the second chamber.

The cooling air directly cools the minor heat generating components in the first chamber. The cooling air further cools the heat sinks in the second chamber, which in turn cool the major heat generating components mounted to the heat sinks outside the second chamber. Finally, the cooling air in the primary circuit directly cools the major heat generating components in the wind tunnel.

It is a feature of the invention that the minor heat generating components outside the primary circuit are cooled by means of the fan along with the heat generating components associated with the primary circuit. Cooling the minor heat generating components and more delicate electronic components outside the primary circuit is achieved by the counterflow circuit. The counterflow circuit extends between the housing downstream end and the first chamber of the primary circuit. The negative pressure in the first chamber draws cooling air into the first chamber from the counterflow circuit, and into the counterflow circuit through the housing downstream end. The cooling air in the counterflow circuit flows parallel to but in the opposite direction as the air in the primary circuit. The air of the counterflow circuit enters the first chamber from its sides, where it mixes with the air in the primary circuit arriving through the housing upstream end. The fan blows the mixed cooling air in the downstream direction through the primary circuit second chamber. Thus, all the air under positive pressure from the fan flows through the second chamber. The temperature of the air entering the fan is only slightly above ambient, because only the minor heat generating components are cooled by the air in the counterflow circuit and by the air in the primary circuit first chamber. Accordingly, maximum cooling capacity is available to the air in the primary circuit second chamber. The air flowing past the heat sinks and through the wind tunnel provides adequate cooling for the major heat generating components mounted to the first and second heat sinks and for the major heat generating components located in the wind tunnel.

Other advantages, benefits, and features of the present invention will become apparent to those skilled in the art upon reading the detailed description of the invention.

DETAILED DESCRIPTION OF THE INVENTION

Figure 1:
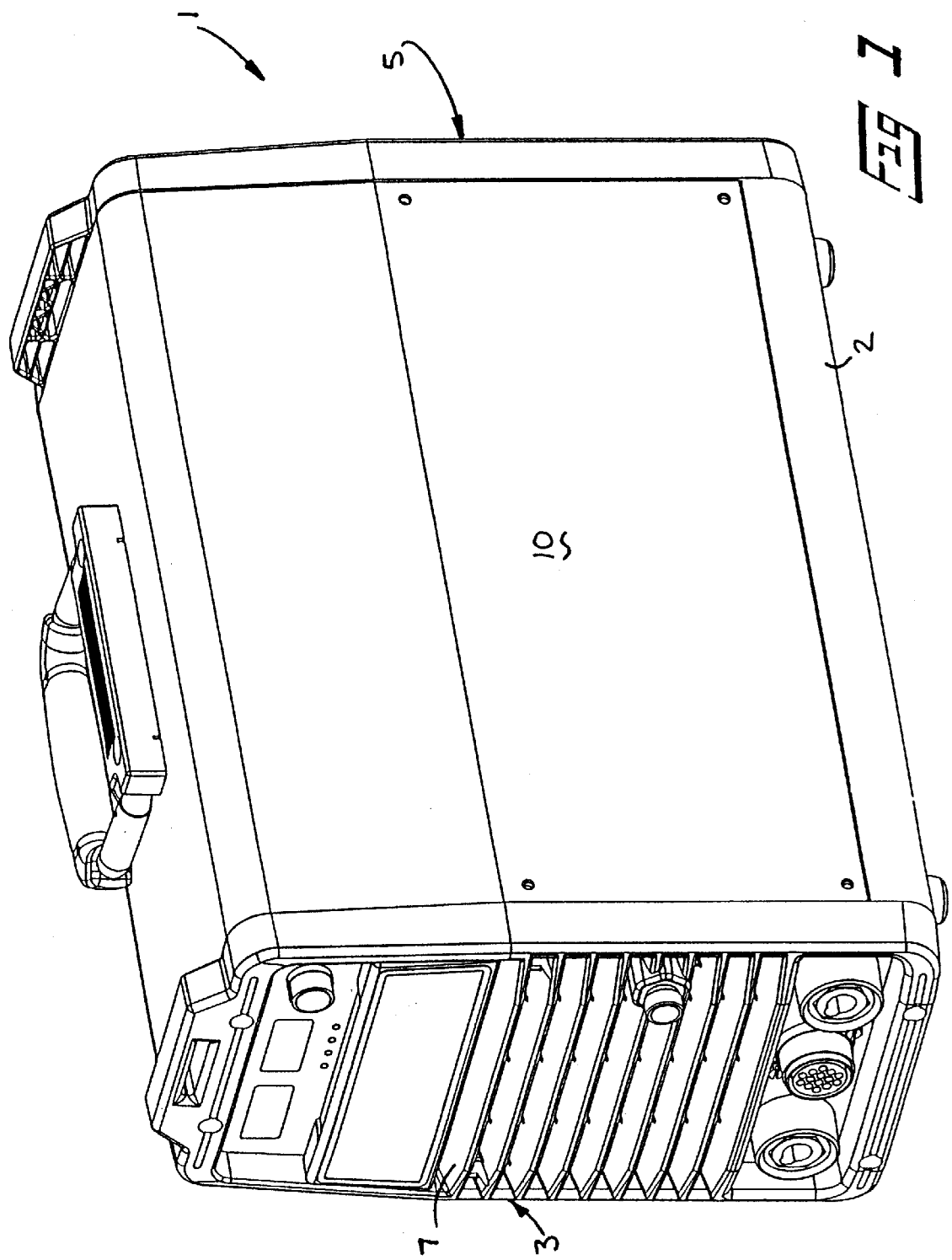
FIG. 1 is a perspective view of a welding machine power supply that includes the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to the drawings, an electronic power supply 1 is illustrated that includes the present invention. The particular power supply 1 shown is for a tungsten inert gas (TIG) welding machine. However, it will be appreciated that the invention is not limited to welding applications.

The power supply 1 is comprised of a base 2, a front end panel 3, and a back end panel 5. The front end panel 3 has louvers 7, and the back end panel 5 has similar louvers 9. A top cover 10, having an inverted U-shape, is assembled to the end panels and the base, such as by fasteners not illustrated in the drawings that engage holes 16 in the base 2. The base, end panels, and top cover 10 cooperate to create an interior space of the power supply 1.

Figure 2:
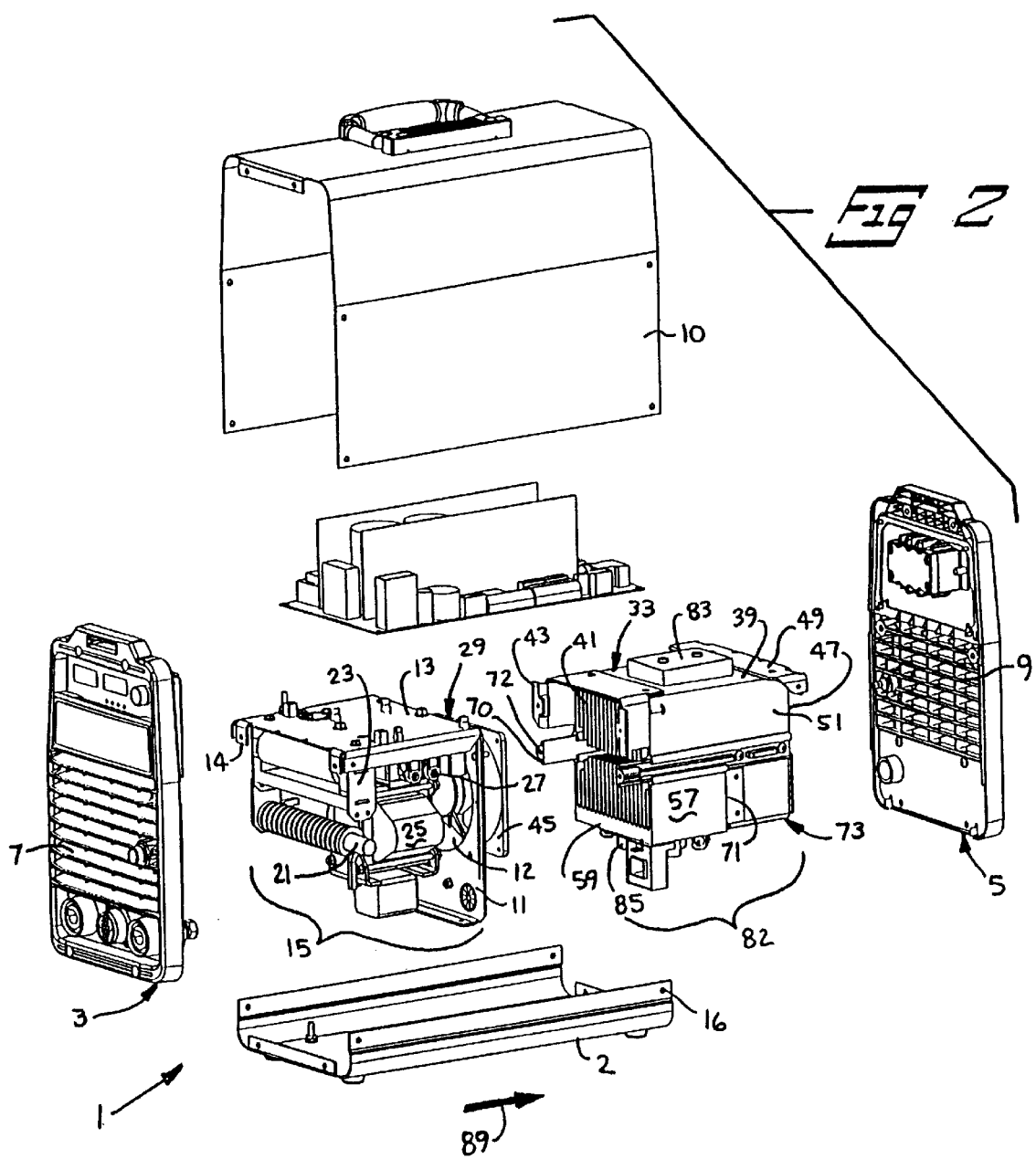
FIG. 2 is an exploded view showing the major subassemblies of the welding machine power supply of FIG. 1.

In accordance with the present invention, a vertical wall 11 upstands from the base 2 between the two end panels 3 and 5. The vertical wall 11 is the full width of the base and the cover 10. The vertical wall has a large opening 12. A horizontal wall 13 connects the upper end of the vertical wall to the front end panel. As illustrated best in FIG. 2, the horizontal wall 13 has tabs 14 that abut the front end panel. The tabs 14 aid in connecting the horizontal wall to the front end panel by fasteners not shown. The top cover 10 cooperates with the base, vertical wall, horizontal wall 13, and the front end panel to define a magnetics chamber 15. There are openings, such as those represented at reference numerals 17, in the vertical wall, and there are similar openings 19 in the horizontal wall.

Located in the power supply magnetics chamber 15 are a number of electronic components, each of which generates only a minor amount of heat during operation of the welding machine 1. Examples of the minor heat generating components include a coupling coil 21, output inductor 23, transformer 25, and spark gap and high frequency board 27.

Figure 3:
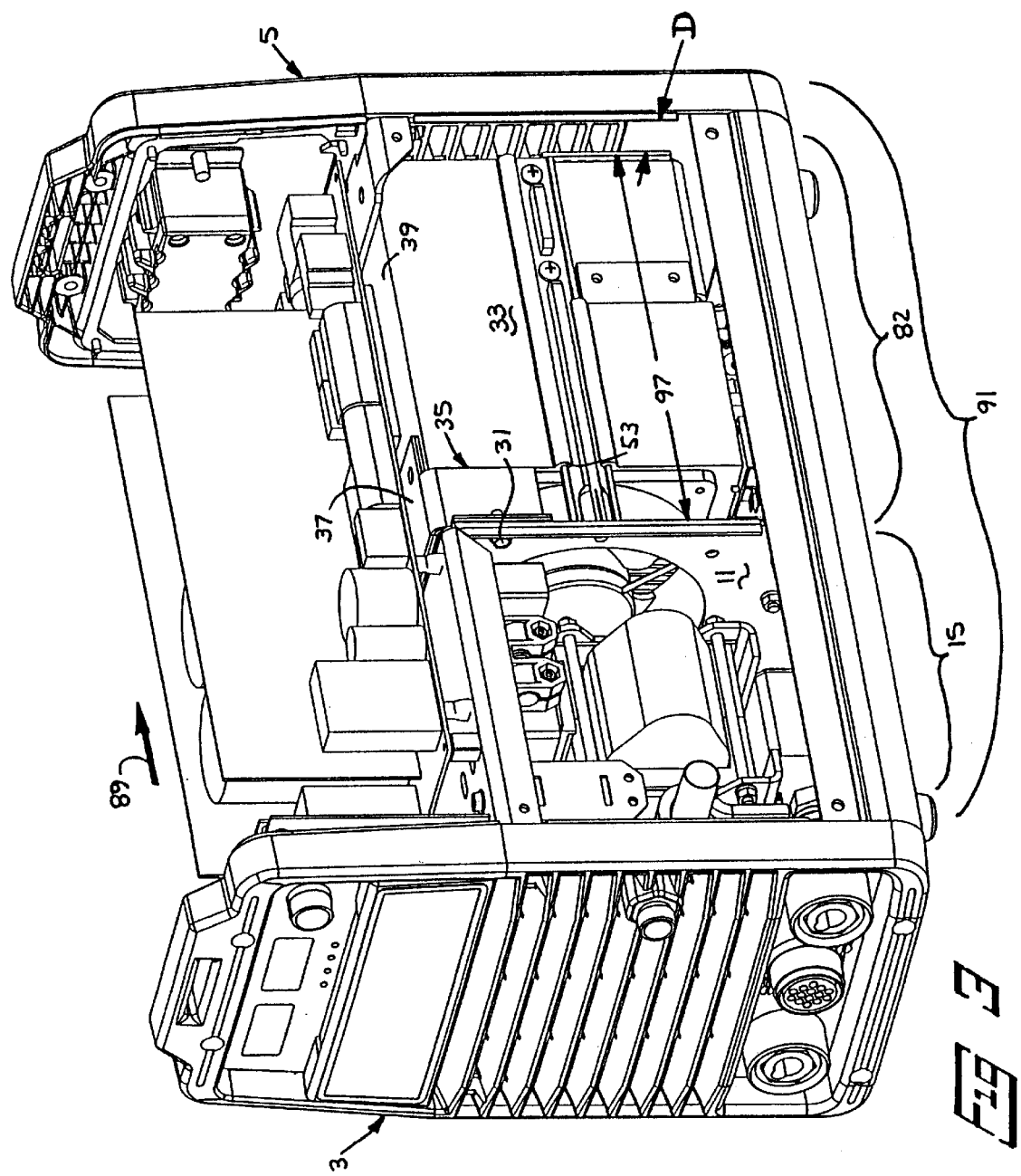
FIG. 3 is a perspective view of a first side of the power supply with the top cover removed.

Attached to the vertical wall 11 over the opening 12 and outside of the magnetics chamber 15 is a motor driven fan 29. In the preferred embodiment, a first flange of the fan 29 is attached to the vertical wall by screws 31, FIG. 3.

Also joined to the vertical wall 11 is an upper heat sink 33. Joining of the upper heat sink 33 to the vertical wall is by an inner bracket 35. A top leg 37 of the inner bracket 35 overlies and is joined to a center wall 39 of the upper heat sink. The inner bracket overhangs the front end 41 of the upper heat sink. Tabs 43 on the inner bracket are used to join it to the vertical wall. The overhang of the inner bracket relative to the upper heat sink front end 41 is such that a second flange 45 of the fan 29 fits snugly against the upper heat sink front end 41. That is, the fan is sandwiched between the upper heat sink and the vertical wall. The second end 47 of the upper heat sink is joined to the power supply back end panel 5 by an outer bracket 49. There is thus a firm structural connection between the end panels 3 and 5 by means of the horizontal wall 13, vertical wall 11, inner bracket, upper heat sink, and outer bracket 49.

In addition to the center wall 39, the upper heat sink 33 also has two side walls 51. At the free end of each side wall 51 is a C-shaped channel 53. Between and parallel to the upper heat sink side walls are multiple fins 55, which are integral with the center wall 39.

A lower heat sink 57 has a center wall 59 and side walls 61. The side walls 61 terminate in respective C-shaped channels 63. There are multiple fins 65 parallel to and between the lower heat sink side walls and integral with the center wall 59.

To hold the heat sinks 33 and 57 to each other, a pair of rails 67 is used. The rails 67 have upper and lower tongues 69 that slide into the channels 53 and 63 of the upper and lower heat sinks, respectively. The front ends 70 of the rails abut the vertical wall 11. The rails are fastened to the vertical wall by fasteners, not shown, that engage holes 72 in the rail ends 70. In that manner, the lower heat sink is suspended from the upper heat sink. It will be noticed that the lower heat sink is approximately one-half as long as the upper heat sink.

In the illustrated construction, there is a wind tunnel 73 between the back end 71 of the lower heat sink 57 and the back end panel 5. The wind tunnel 73 is in the form of a U-shaped bracket having a center leg 75 and upstanding side legs 77. The free ends of the side legs 77 are secured to the rails 67 by fasteners 79. The wind tunnel is electrically isolated from the lower heat sink by insulation strips 81.

The walls 39 and 51 of the upper heat sink 33 and the walls 59 and 61 of the lower heat sink 57 define the periphery of a second chamber 82 that is on the opposite side of the fan 29 as the magnetics chamber 15. The wind tunnel legs 75 and 77 cooperate with the walls of the upper heat sink to define the periphery of the second chamber 82 adjacent the back end panel 5.

Mounted to the outside of the center wall 39 of the upper heat sink 33 is an input rectifier, boost converter, and half-bridge invertor shown collectively at reference numeral 83. Those components generate considerable heat during operation of the welding machine power supply 1. Other major heat generating components include diodes, rectifiers, and a snubber inductor collectively represented at reference numeral 85 and mounted to the center wall 59 of the lower heat sink 57. Another major heat generating component is an input inductor 87 inside the wind tunnel 73. During operation of the power supply 1, only small amounts of heat are generated by the components 21, 23, 25, and 27 in the magnetics chamber 15. On the other hand, considerable heat is generated by the components 83, 85, and 87. Heat from the components 83 is conducted to the upper heat sink 33, and heat from the components 85 is conducted to the lower heat sink 57.

Operation of the fan 29 creates a negative air pressure in the magnetics chamber 15. Consequently, cooling air is drawn in a downstream direction 89 into the magnetics chamber through the louvers 7 in the front end panel 3. The cooling air cools the minor heat generating components 21, 23, 25, and 27 in the magnetics chamber. The cooling air is warmed only slightly as it flows through the magnetics chamber to the fan.

It is a feature of the invention that the periphery of the second chamber 82 is arranged relative to the fan 29 such that all of the air blown by the fan flows through the second chamber; none of the air flows around the outsides of the heat sinks 33, 57 or the wind tunnel 73. Specifically, all the air flows past the fins 55 and 65 of the upper and lower heat sinks 33 and 57, respectively, which cools the fins and therefore the major heat generating components 83 and 85. The cooling air also passes over the input inductor 87 to cool it.

From the second chamber 82, the cooling air flows out the louvers 9 in the back end panel 5. It is thus seen that there is a primary circuit 91 for the cooling air that extends from the front end panel 3, through the magnetics chamber 15, and through the second chamber 82 to the back end panel 5. All the cooling air in the primary circuit 91 flows in the downstream direction 89.

Further in accordance with the present invention, electronic components in the power supply 1 other than those cooled by the air flowing in the primary circuit 91 are also cooled. Looking especially at FIGS. 2, 3, and 5, there are a number of electronic components 93 inside the power supply 1 but outside of the primary circuit and not mounted to either heat sink 33 or 57. Although the components 93 do not generate major amounts of heat, it is nevertheless beneficial to cool them.

Figure 4:
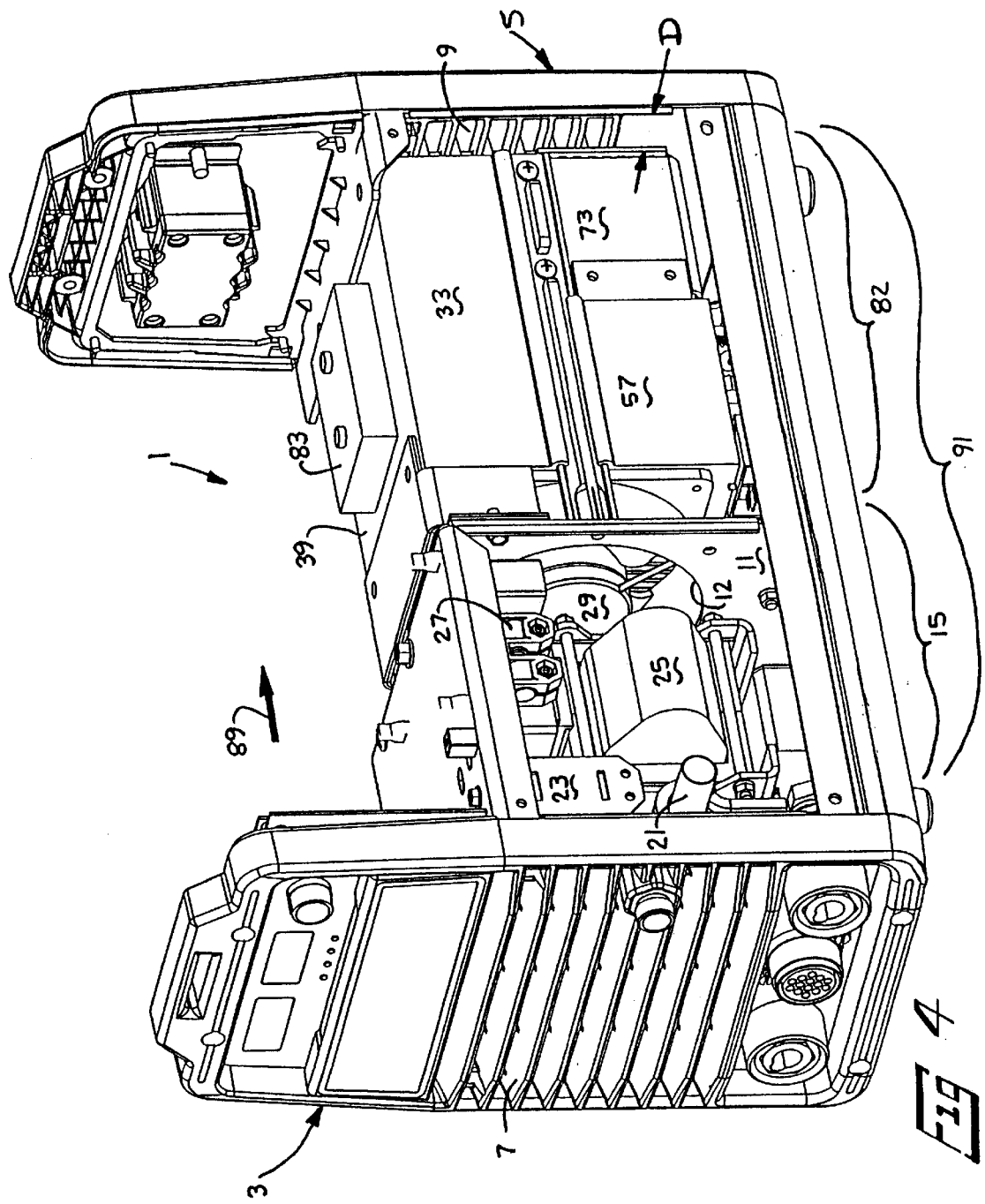
FIG. 4 is a view similar to FIG. 3, but showing some electronic components removed.
Figure 5:
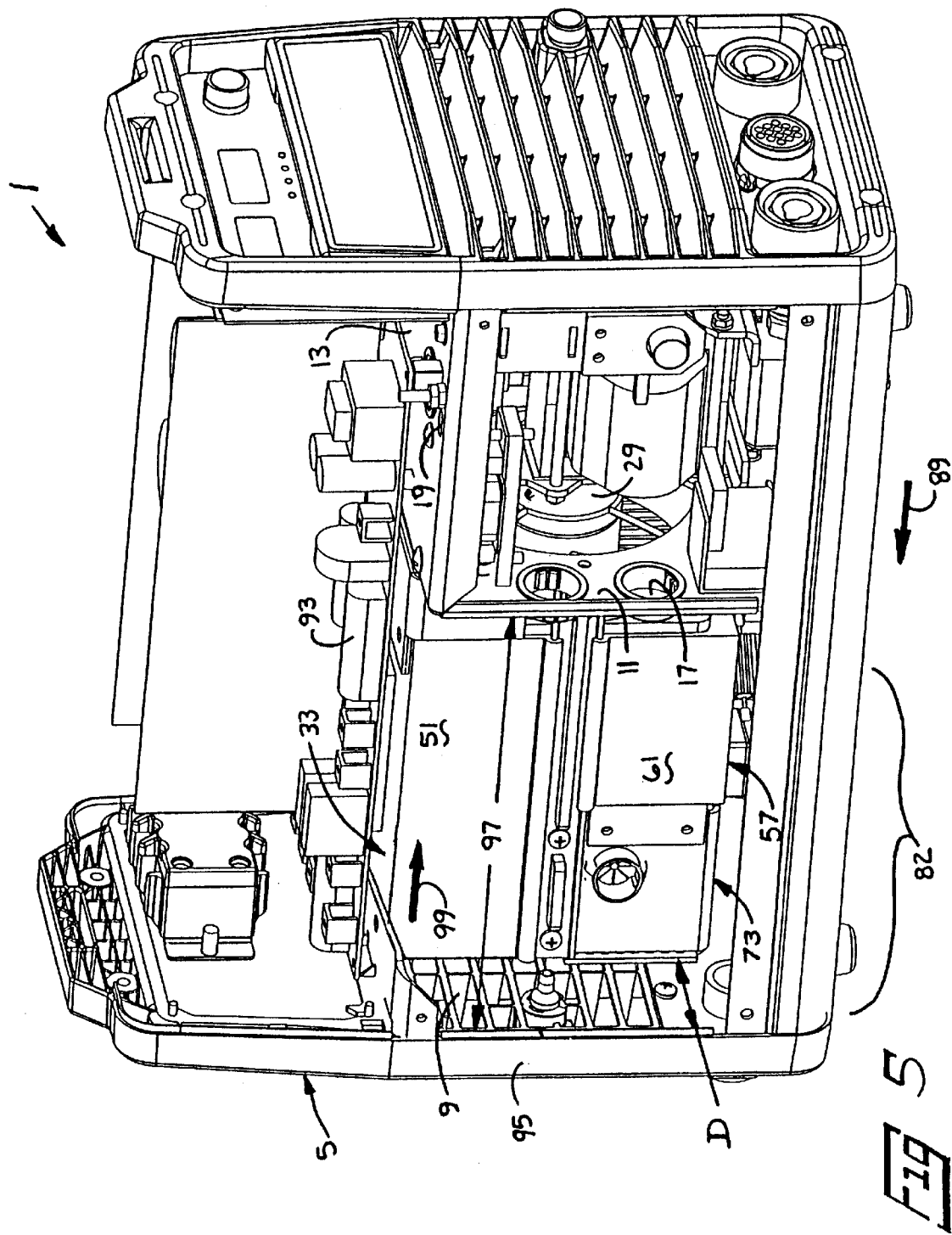
FIG. 5 is a perspective view of a second side of the welding machine power supply.
Figure 6:
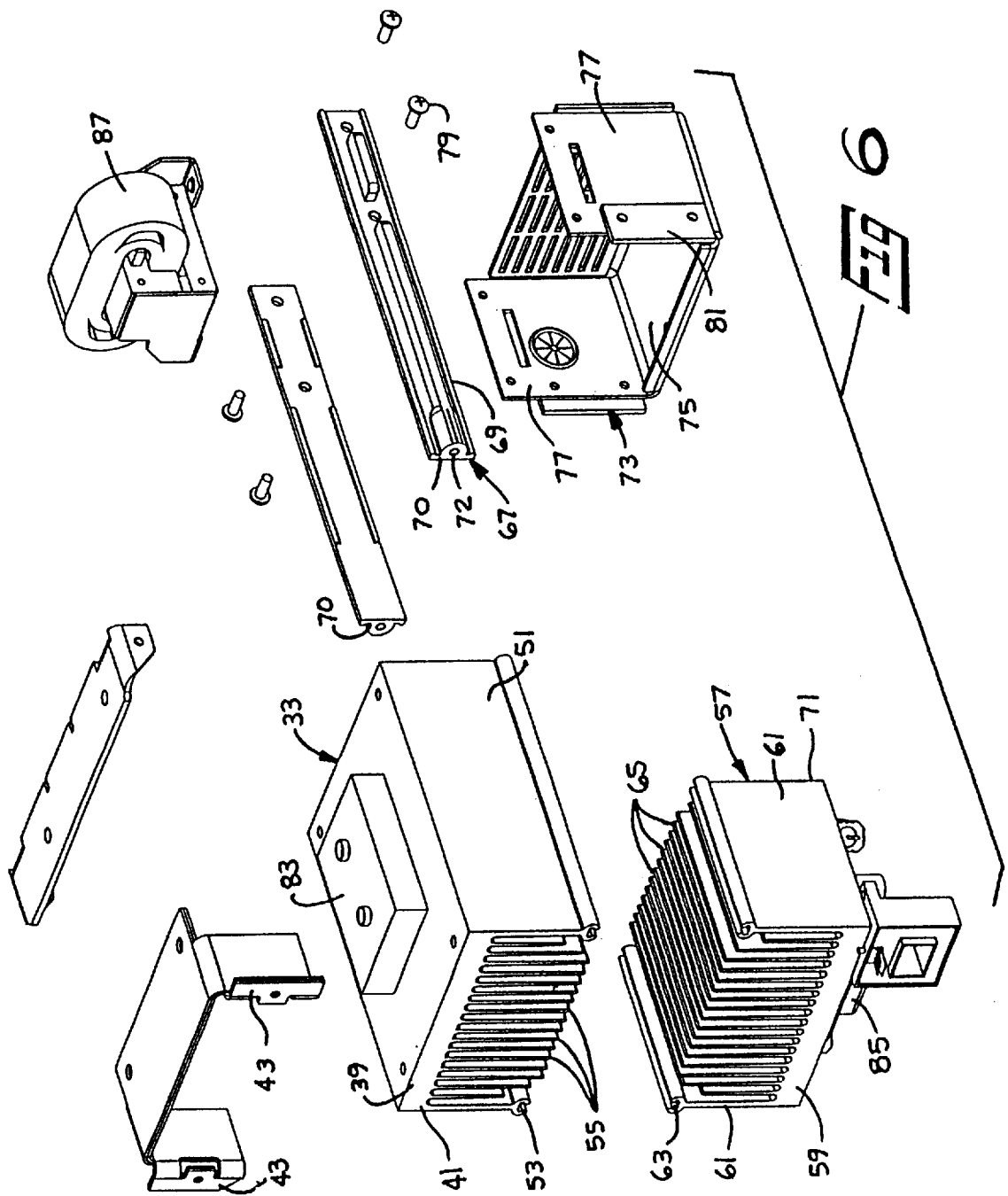
FIG. 6 is an exploded perspective view of the second chamber of the welding machine power supply.
Figure 7:
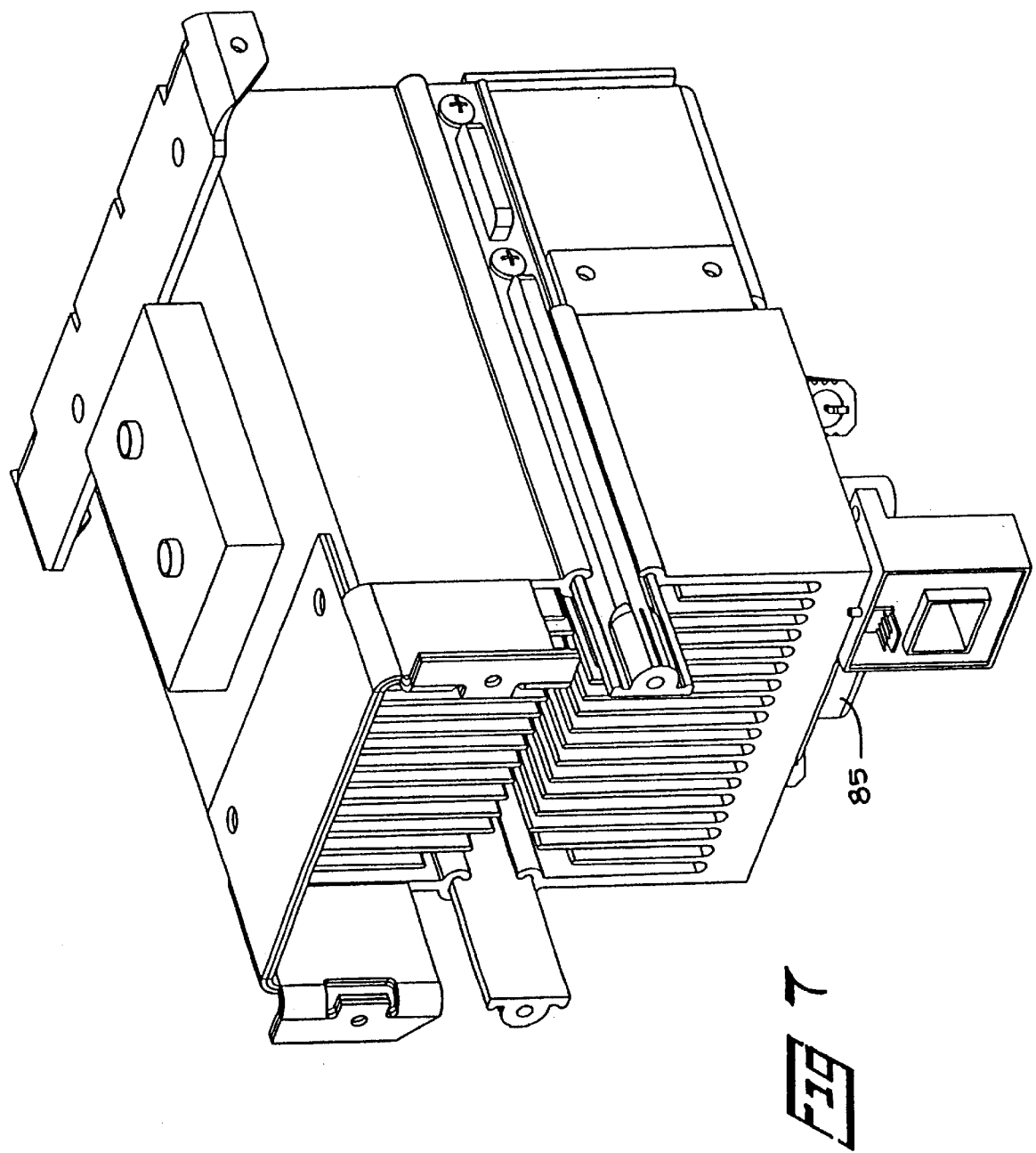
FIG. 7 is a perspective view of the second chamber of the primary circuit in its assembled condition.

It will be noticed in FIGS. 4 and 5 that the heat sinks 33 and 57 and the wind tunnel 73 do not take up the full width of the power supply 1. Rather, there is a distance D between the side walls 51 and 61 of the upper and lower heat sinks, respectively, and the side edges 95 of the back end panel 5. Consequently, when the top cover 10 is in place, there are spaces 97 inside the power supply between the two sides of the top cover and the associated sides of the second chamber 82. The spaces 97 are open to atmospheric air through the louvers 9 in the back end panel.

As described previously, operation of the fan 29 causes cooling air to flow in the downstream direction 89 through the primary circuit 91. At the same time, the negative-pressure in the magnetics chamber 15 draws air from the spaces 97 through the openings 17 in the vertical wall 11 and through the openings 19 in the horizontal wall 13 into the magnetics chamber. Consequently, a counterflow circuit 99 is created from the louvers 9 in the back end panel 5 to the magnetics chamber. The flowing cooling air in the counterflow circuit 99 flows past and cools the electronic components 93. The air from the counterflow circuit mixes with the air in the primary circuit in the magnetics chamber. The mixed air flows in the downstream direction 89 from the fan 29 through the second chamber 82. Since the components 93 produce only minor amounts of heat, the cooling air entering the second chamber is cool enough to efficiently cool the heat sinks 33, 57 and the inductor 87 in the wind tunnel 73.

Thus, it is apparent that there has been provided, in accordance with the invention, cooling circuits for a welding machine power supply, including a TIG welding machine power supply, that fully satisfy the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A power supply for a welding machine comprising:
 a. a base;
 b. front and back end panels upstanding from the base and having respective louvers therethrough;
 c. a top cover over the base and front and back end panels and cooperating therewith to define an interior space;
 d. a magnetics chamber containing first heat producing components in the power supply interior space adjacent the front end panel and open to atmospheric air only through the louvers in the front end panel;
 e. a second chamber containing second heat producing components in the power supply interior space between the magnetics chamber and the back end panel, the second chamber cooperating with the magnetics chamber to form a primary air circuit that extends from the louvers in the front end panel to the louvers in the back end panel; and
 f. a fan between the magnetics chamber and second chamber that creates a negative pressure in the magnetics chamber and a positive pressure in the second chamber,
 wherein the magnetics chamber is partially defined by a vertical wall generally aligned with the fan and located between the front and back end panels, and a horizontal wall between the vertical wall and the front end panel, the vertical and horizontal walls reaching the full width of the base and the top cover, and the vertical wall extending between the base and the horizontal wall, to thereby prevent any air from entering the second chamber except through the fan,
 so that operation of the fan causes cooling air to flow in a first direction through the primary circuit from the front end panel to the back end panel and thereby cools the first and second heat producing components.

2. The power supply of claim 1 wherein the second chamber comprises:
 a. a first heat sink having center and side walls; and
 b. a second heat sink having center and side walls, the center and side walls of the second heat sink coacting with the center and side walls of the first heat sink, respectively, to define a second chamber periphery that cooperates with the fan such that all the air flowing in the primary circuit second chamber flows solely inside the second chamber periphery and through the first and second heat sinks.

3. The power supply of claim 2 wherein:
 a. the first heat sink reaches between the fan and the back end panel; and
 b. a wind tunnel between the second heat sink and the back end panel cooperates with the center and side walls of the second heat sink to define the periphery of the second chamber adjacent the back end panel.

4. The power supply of claim 2 further comprising means for holding the side walls of the second heat sink to the side walls of the first heat sink.

5. The power supply of claim 2 wherein the fan is sandwiched between the vertical wall and the first and second heat sinks.

6. The power supply of claim 2 wherein:
 a. the power supply further comprises-a first bracket that joins the first heat sink to the vertical wall, and a second bracket that joins the first heat sink to the back end panel; and
 b. the horizontal wall, vertical wall, first bracket, first heat sink, and second bracket cooperate to form a structural connection between the front and back end panels.

7. The power supply of claim 1 wherein:
a. the top cover, back end panel, front end panel, magnetics chamber, and second chamber cooperate to define a counterflow circuit in the interior space between the back end panel and the magnetics chamber; and
b. operation of the fan causes cooling air to flow in the counterflow circuit in a second direction opposite the first direction from the back end panel to the magnetics chamber.

8. A power supply comprising:
a. first and second end panels having respective openings therethrough, a base, and a top cover all in operative association with each other to define an interior space;
b. a primary cooling circuit inside the interior space and extending between the first and second end panel openings;
c. a plurality of major heat generating components in the interior space in operative association with the primary circuit;
d. a counterflow circuit in the interior space but outside the primary circuit and extending between the second end panel openings and the primary circuit;
e. a plurality of minor heat generating components in the interior space in operative association with the counterflow circuit; and
f. means for blowing cooling air in a first direction through the primary circuit to cool the major heat generating components and for simultaneously drawing cooling air through the counterflow circuit in a second direction opposite the first direction to cool the minor heat generating components.

9. The power supply of claim 8 wherein:
a. the primary circuit comprises a first chamber and a second chamber;
b. the counterflow circuit extends between the second end panel and the first chamber; and
c. the means for propelling cooling air comprises a fan between the first and second chambers, the fan operating to produce a negative air pressure in the first chamber, the fan further operating to produce a positive air pressure in the second chamber, so that cooling air is drawn into the first chamber from the atmosphere through the first end panel openings and from the counterflow circuit.

10. The power supply of claim 9 wherein:
a. the second chamber is comprised of first and second heat sinks having respective walls that cooperate to define a periphery of the second chamber, the second chamber periphery being arranged such that all the air blown by the fan flows through the heat sinks; and
b. the major heat generating components are mounted to the first and second heat sinks outside of the second chamber.

11. The power supply of claim 10 wherein the second chamber is further comprised of a wind tunnel between the second heat sink and the second end panel, the wind tunnel cooperating with the first and second heat sinks to define the periphery of the second chamber between the first chamber and the back end panel.

12. The power supply of claim 10 wherein:
a. the first chamber is partially defined by a vertical wall, and a horizontal wall between the vertical wall and the first end panel; and
b. the fan is sandwiched between the vertical wall and the first and second heat sinks.

13. The power supply of claim 10 wherein:
a. each of the first and second heat sinks has a center wall and a pair of side walls; and
b. the welding machine further comprises a pair of rails that hold the side walls of the first and second heat sinks to each other.

14. The power supply of claim 9 wherein the second chamber has a periphery defined by center and side walls-of a first heat sink, by center and side walls of a second heat sink, and by center and side legs of a wind tunnel that are generally coplanar with the center and side walls, respectively, of the second heat sink.

15. The power supply of claim 14 wherein the periphery of the second chamber is arranged relative to the fan such that all the air blown by the fan flows through the second chamber.

16. The power supply of claim 14 further comprising means for holding the side walls of the second heat sink to associated side walls of the first heat sink.

17. The power supply of claim 14 further comprising means for holding the side walls of the second heat sink to the side walls of the first heat sink and for holding the side legs of the wind tunnel to the side walls of the first heat sink.

18. A method of cooling a power supply for a welding machine having first and second end panels comprising the steps of:
a. providing a primary circuit for cooling air that extends between the first and second end panels;
b. providing a counterflow circuit outside the primary circuit for cooling air that extends between the second panel and the primary circuit;
c. mounting first selected heat generating components in operative association with the primary circuit;
d. mounting second selected heat generating components in operative association with the counterflow circuit;
e. flowing cooling air in a first direction from the first end panel through the primary circuit to the second end panel and thereby cooling the first selected heat generating components; and
f. flowing cooling air in a second direction opposite the first direction through the counterflow circuit from the second end panel to the primary circuit and thereby cooling the second selected heat generating components.

19. The method of claim 18 wherein:
a. the step of providing a primary circuit comprises the steps of providing a first chamber adjacent the first end panel, and a second chamber adjacent the second end panel;
b. the step of flowing cooling air in the first direction comprises the step of producing a negative air pressure in the first chamber and drawing atmospheric air through the first end panel into the first chamber; and
c. the step of flowing cooling air in the second direction comprises the step of drawing atmospheric air through the second end panel into the counterflow circuit and into the first chamber.

20. The method of claim 19 wherein:
a. the step of providing a second chamber comprises the steps of:
  i. providing first and second heat sinks having respective center and side walls; and
  ii. arranging the first and second heat sinks such that the center and side walls thereof define a periphery of the second chamber; and b. the step of flowing cooling air in the first direction comprises the step of flowing all the cooling air in the first direction through the first and second heat sinks.

21. The method of claim 20 wherein the step of providing a second chamber comprises the further step of providing a wind tunnel having center and side legs that are substantially coplanar with the center and side walls, respectively, of the second heat sink and that thereby cooperate with the first and second heat sinks to define the periphery of the second chamber, so that all of the cooling air flowing in the first direction flows through the first and second heat sinks and the wind tunnel.

* * * * *